June 24, 1930.  W. L. GRIMES  1,766,293
BEET LOADER
Filed Sept. 9, 1926   2 Sheets-Sheet 1
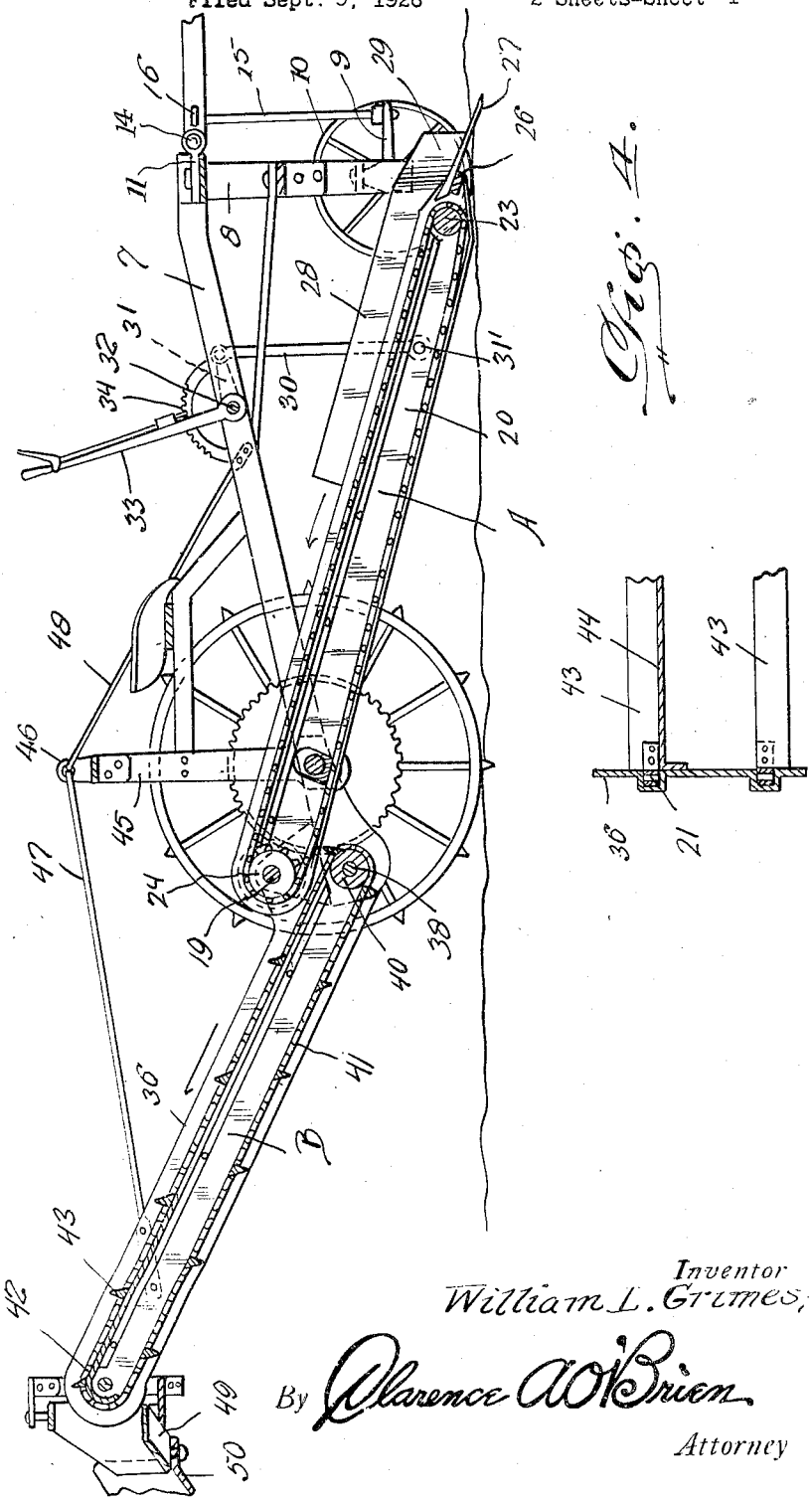
Inventor
*William L. Grimes,*
By *Clarence A. O'Brien*
Attorney

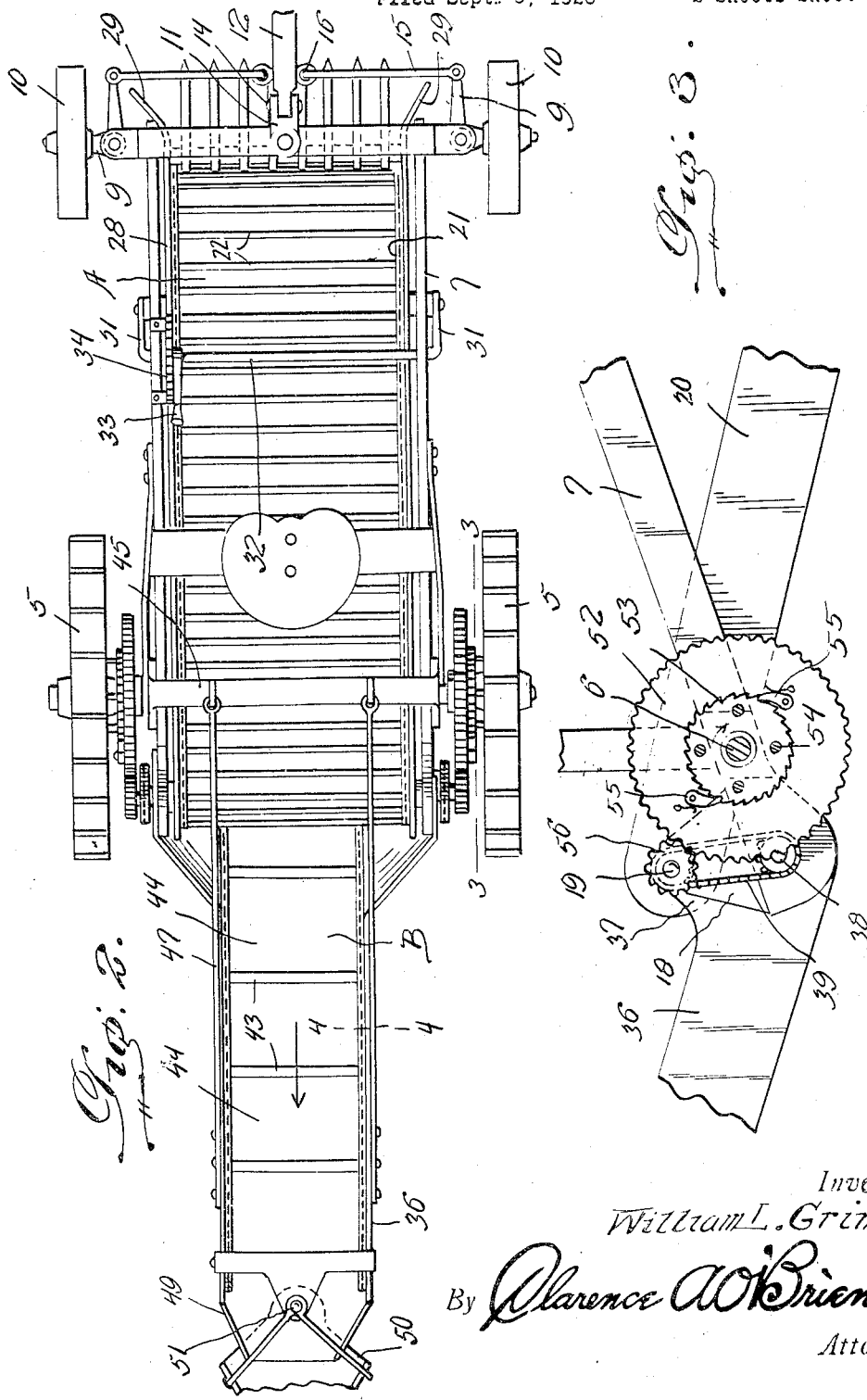

Patented June 24, 1930

1,766,293

UNITED STATES PATENT OFFICE

WILLIAM L. GRIMES, OF FRANKLIN, MINNESOTA

BEET LOADER

Application filed September 9, 1926. Serial No. 134,455.

The present invention relates to a beet loader and aims to provide a structure for lifting the beets after they have been pulled from the ground and elevating them into a wagon box or rack.

Another important object of the invention lies in the provision of a structure of this nature including a wheeled frame having a front elevating conveyor and a rear elevating conveyor, the front conveyor possessing a structure which separates the sand, dirt, and the like from the beets and delivers said beets in a comparatively clean condition to the rear elevating conveyor which delivers them into a spout.

Another very important object of the invention lies in the provision of a beet loading mechanism of this nature which is exceedingly simple in its construction, efficient and reliable in operation, strong and durable, comparatively inexpensive to manufacture, and otherwise well adapted to the purpose for which it is designed.

With the above and numerous other objects in view as will appear as the description proceeds, the invention resides in certain novelties of construction, and in the combination and arrangement of parts, as will be hereinafter more fully described and claimed.

In the drawing:

Figure 1 is a longitudinal vertical section through the machine embodying the features of my invention, Fig. 2 is a top plan view thereof, Fig. 3 is a detailed section taken substantially on the line 3—3 of Fig. 2, Fig. 4 is a detailed section taken substantially on the line 4—4 of Fig. 2.

Referring to the drawing in detail, it will be seen that the numerals 5 denote a pair of wheels journaled on an axle shaft 6. A pair of side beams 7 are pierced adjacent their rear ends by the axle shaft 6 and have a frame structure 8 depending from their forward ends. Steering knuckles 9 are pivotally mounted in the frame structure 8 and relatively small wheels 10 are journaled thereon. A bracket 11 is attached to the top cross beam of the frame 8 and has a tongue 12 pivotally engaged therewith as at 14. Links 15 are engaged with the tongue as at 16 and are engaged with the ends of the steering knuckles 9 so that as the tongue is swung to the right or the left the wheels 10 are moved in unison therewith. Extensions 18 rise from the rear ends of the side beams 7 of the main frame and receive a shaft 19 which extends through the side members 20 of an endless chain elevating conveying mechanism denoted generally by the letter A and including chains 21 connected by a plurality of parallel spaced transverse slats 22. The chains are trained over a shaft 23 journaled between the lower ends of the side members 20 and over sprockets 24 on the shaft 19. A cross bar 26 extends between the front ends of the side member 20 in front of the shaft 23 and has guiding and gathering tines 27 projecting forwardly and downwardly therefrom. Plates 28 are mounted on the side members 20 at their forward portions and flare outwardly at their outward ends as indicated at 29 for assisting in gathering the beets. It is to be noted that the elevating conveyor A normally inclines forwardly and downwardly in respect to the axle shaft 6. Links 30 are engaged as at 31' with the sides 20 while the upper ends of these links 30 are pivotally engaged with the extremities of cranks 31 on a crank shaft 32 journaled in intermediate portions of the side beams 7. A crank 33 is fixed on the crank shaft 32 for operating the same in order that the front end of the elevating conveyor A may be raised and lowered as desired. Suitable dog and rack means 34 is associated with the lever. A rear elevating conveyor is denoted by the letter B and terminates at its front end under the upper rear end of the elevating conveyor A. This elevating conveyor B inclines upwardly and rearwardly and includes side members 36 having extensions 37 at their forward ends rising therefrom and journaled on the shaft 19. A shaft 38 is journaled through the rear ends of the side beams 7 and through the forward ends of the side members 36. The shafts 19 and 38, therefore, rigidly engage the conveyor B with respect to the main frame including the side beams 7. Chains 39 are operatively engaged with shafts 19 and 38 for rotating said shafts in unison. A roller 40 is mounted on the shaft 38 between the side members 36. Endless chains 41 are trained over the roller 40 and over a shaft 42 journaled in the upper ends of the side members 36. These chains have parallel cross slats 43 and flexible plates 44 between the slats so as to prevent the beets from falling between the slats. An arch 45 has its ends pierced by the axle shaft 6 and is of a substantial inverted U-shaped formation having a pair of eye-extensions 46 on its bight portion to which are attached bracing rods 47 extending rearwardly and engaged with the side members 36 and bracing rods 48 which extend forwardly and are engaged with the side beams 7. A chute 49 is mounted at the rear upper end of the elevated conveyor B and a second chute 50 is pivotally mounted at 51 to the first chute.

Gears 52 are fixed to the axle shaft 6 while ratchet wheels 53 are fixed to the wheels 5 by means of bolts 54 or in any other suitable manner. Spring pressed pawls 55 are mounted on the gears 52 for engagement with the ratchet wheels 53 so that when the wheels rotate in a forward direction, the gears 52 are rotated and thus the wheel which is rotating faster will actually operate the device. Pinions 56 are mounted on the shaft 19 and mesh with the gears 52.

It will be thus seen that as the machine is pulled along by the tongue 12 in any suitable manner the conveyors A and B will be in operation. The beets will be urged upwardly on the tines 37 to be delivered to the forward elevating conveyor A from which they will be delivered to the lower end of the rear elevating conveyor B. As the beets pass over the forward elevating conveyor A the dirt and like material will be taken therefrom so that when the beets reach the rear elevating conveyor B they will be substantially clean for deliverance into a wagon or the like through the intermediacy of chutes 49 and 50.

It is thought that the construction, operation, and advantages of this invention will now be clearly understood by those skilled in this art without a more detailed description thereof. The present embodiment of the invention has been disclosed in detail merely by way of example since in actual practice it attains the features of advantage enumerated as desirable in the statement of the invention and in the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A mechanism of the class described including, in combination, a wheeled axle shaft, an arch mounted on and rising from the shaft, a pair of forwardly and upwardly inclined side beams disposed in parallelism, the axle shaft being journaled in the side beams adjacent their rear ends, an auxiliary frame depending from the forward end of the side beams, wheels journaled on the auxiliary frame, extensions rising from the rear end of the side beams, a conveyor mechanism, pivot means located rearwardly and upwardly of the axle shaft for mounting the rear end of the conveyor mechanism in the upper ends of the extensions, said conveyor mechanism inclining downwardly and forwardly in respect to the pivot means and having slots through which the axle shaft extends, means on the side beams for raising and lowering the conveyor mechanism, a second conveyor, means for mounting the second conveyor mechanism on the pivot means and on the rear ends of the side beams so as to incline upwardly and rearwardly therefrom, a gear operatively connected with one of the wheels of the wheel axle, a gear in mesh with the first mentioned gear and operatively connected with the rear end of the first conveyor mechanism, and a chain and sprocket mechanism between the second gear and the driving shaft of the second conveyor mechanism.

In testimony whereof I affix my signature.

WILLIAM L. GRIMES.